United States Patent
Ishak

[11] 3,885,878
[45] May 27, 1975

[54] COLOUR MEASURING DEVICES
[75] Inventor: Ishak Girgis Hanna Ishak, Teddington, England
[73] Assignee: The Research Association of British Point, Colour and Varnish Manufacturers, Middlesex, England
[22] Filed: Apr. 26, 1973
[21] Appl. No.: 354,709

Related U.S. Application Data
[63] Continuation of Ser. No. 107,054, Jan. 18, 1971.

[30] Foreign Application Priority Data
Jan. 19, 1970 United Kingdom.............. 2520/70

[52] U.S. Cl. .............. 356/176; 250/226; 250/227; 209/111.6; 356/188
[51] Int. Cl. .............................................. G01j 3/50
[58] Field of Search ......... 356/173, 188, 220, 96 B; 250/226, 227; 209/111.5, 111.6

[56] References Cited
UNITED STATES PATENTS
2,686,452 8/1954 Bentley........................... 356/176 X OTHER PUBLICATIONS
Morris, Paint Technology, vol. 24, no. 270, May, 1960, pp. 26–29 TP 957.Al.
Adams et al., Printing Technology, July, 1964, pp. 16–25, see page 21, especially.
Ishikawa et al., Bulletin of the Tokyo Dental College, vol. 10. no. 4, pp. 191-7, November, 1969, pp. 191-7.

*Primary Examiner*—Robert J. Webster
*Attorney, Agent, or Firm*—Dowell & Dowell

[57] ABSTRACT

This invention relates to colour measuring devices for determining the colour of a sample such as paint. The device includes a sensing head which is positioned to receive light from the sample. This head collects light from a number of directions from the sample and the collected light is conducted, preferably along bundles of fibre optics, to a light detector. Preferably these are five to six bundles of fibre optics which collect light from the sample in directions at 45° to the plane of the sample and spaced evenly around the sample. Interposed in one or more of the paths of the collected light are individual filters, being chosen so that the output from the detector is representative of one of the three primary stimuli X, Y, and Z of the Standard Observer as defined by the Commission Internationale de L'Eclairage or some other function. Means are also provided to illuminate the sample.

6 Claims, 7 Drawing Figures

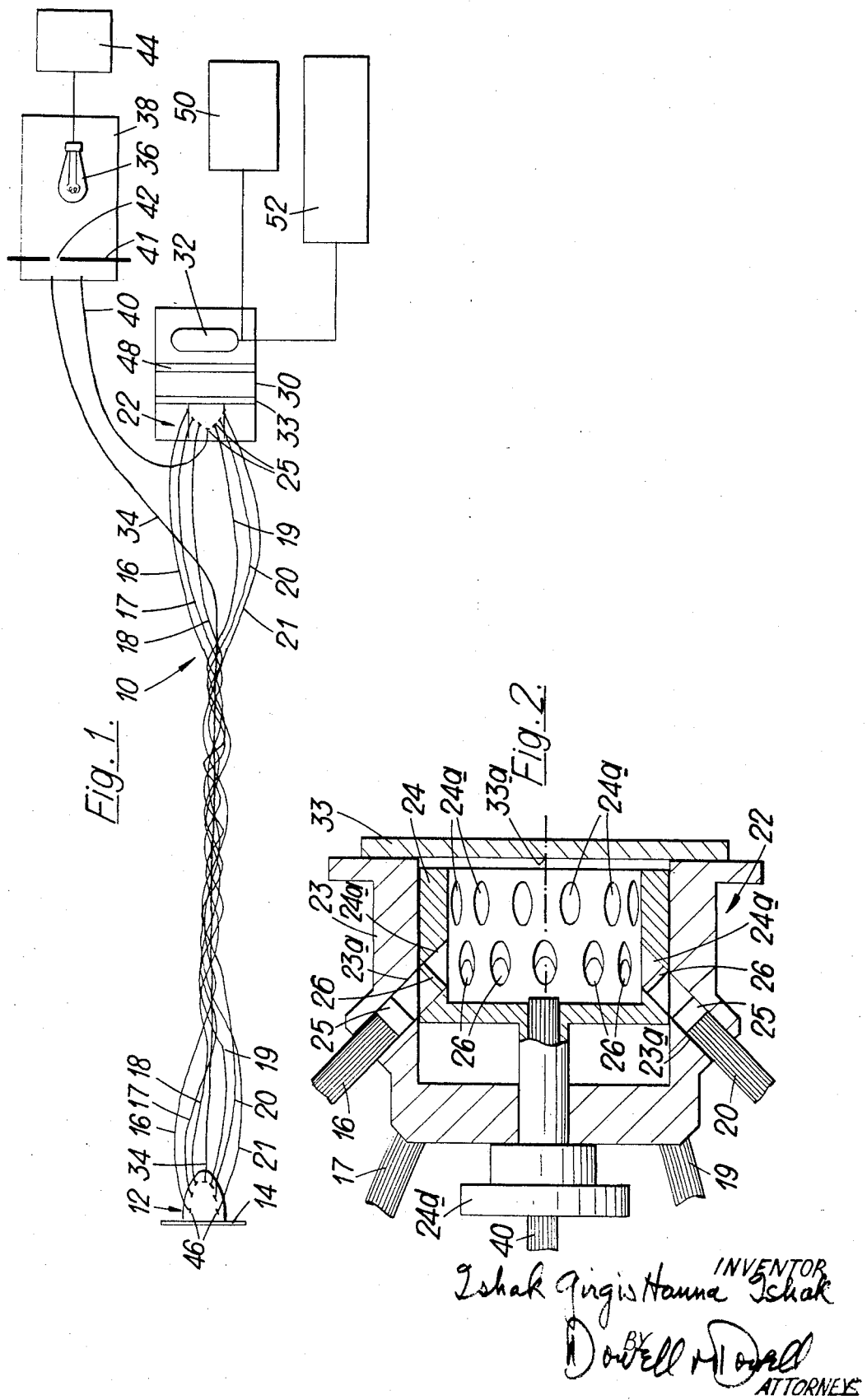

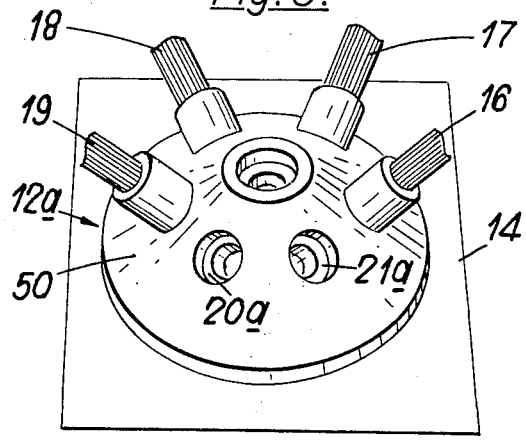
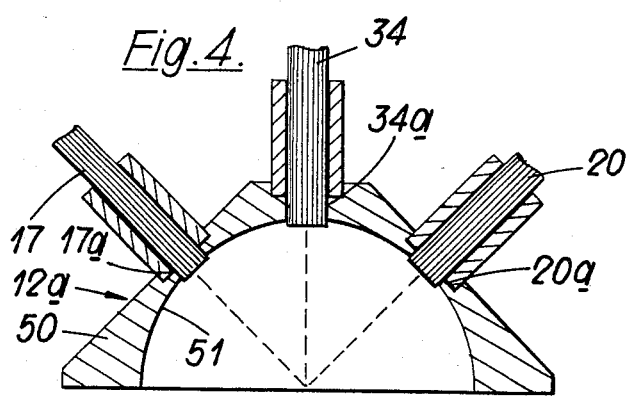
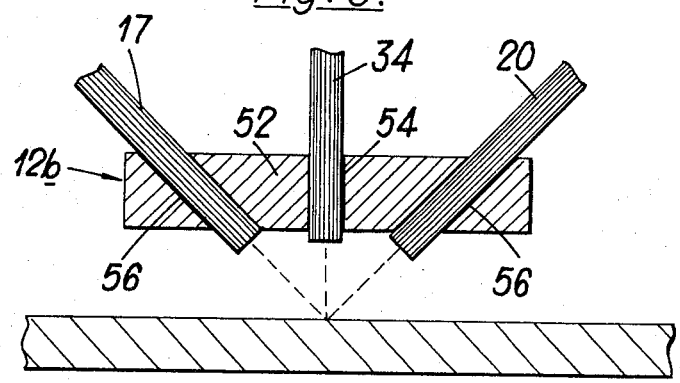

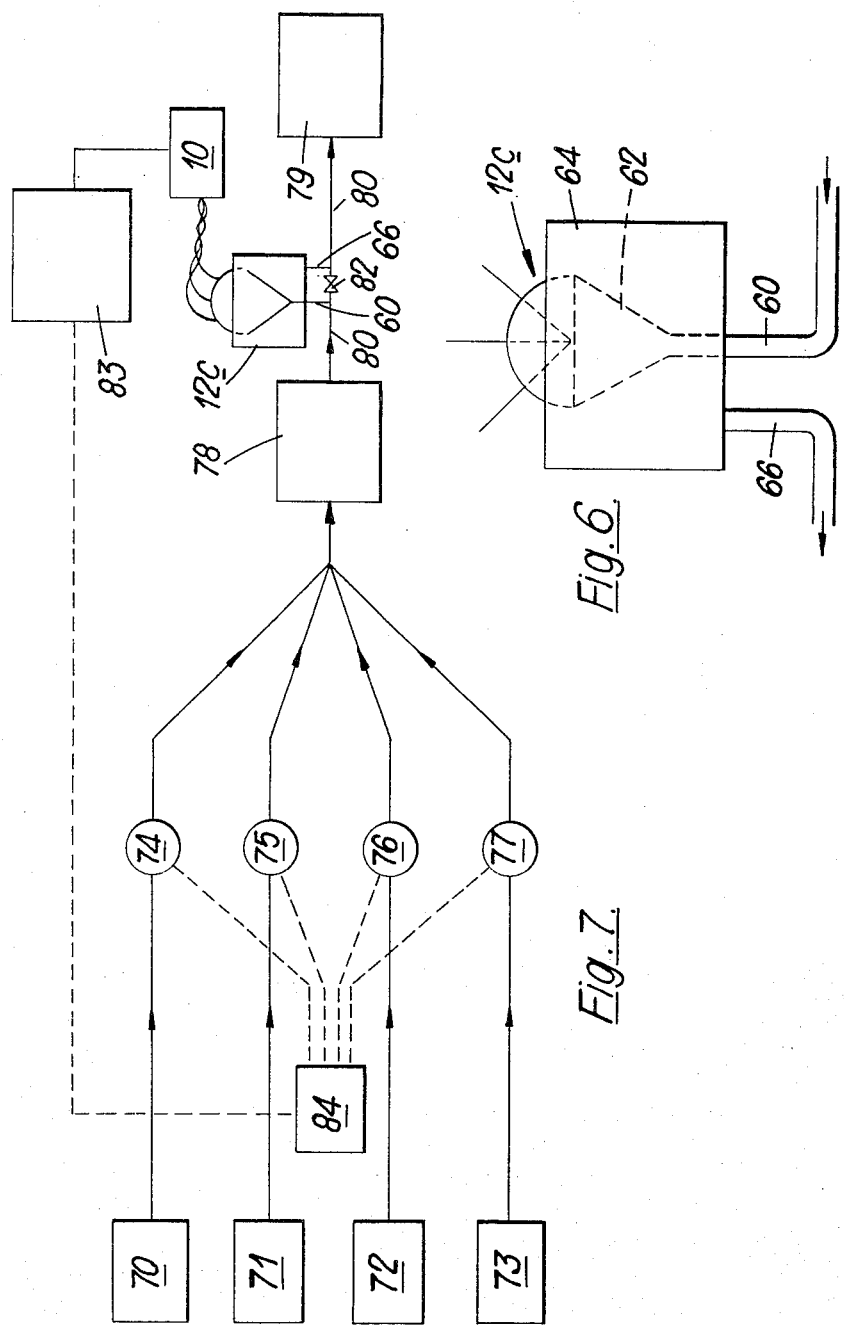

COLOUR MEASURING DEVICES

This is a continuation of application Ser. No. 107,054, filed Jan. 18, 1971.

This invention relates to colour measuring devices, otherwise known as colorimeters.

BACKGROUND TO THE INVENTION

The measurement of colour in objective terms depends on determination of a visual match with a combination of defined stimuli. To provide an international standard the Commission Internationale de L'Eclairage (C.I.E.) has adopted a standard colour measurement system based on spectral response curves for a Standard Observer and three primary stimuli X, Y, Z, defined in terms of lights of given wavelengths. Any colour can be accurately defined in terms of the amounts of these three stimuli required to match it. Colour can also be defined in terms of other functions such as L, a and b.

The spectral response curves for the Standard Observer for the three primary stimuli are accurately known and it is necessary that the spectral sensitivity of any photoelectric colorimeter should reproduce these response curves as accurately as possible so that accurate values of X, Y and Z can be determined for any colour. The spectral response of the colorimeter depends on the energy distribution of the light source, the spectral transmission of the filters or other optical elements and the response of the detector. Various attempts have been made to design colorimeters with the correct response curves, using combinations of filters in the light paths to match the three responses in turn. Usually only an approximate correspondence is achieved, partly because the choice of filters is based on average data for the light sources and detectors, and partly because if a large number of subtractive filters are used to obtain a reasonable match, the amount of light passing the filters and reaching the detector is of a low order and so the colorimeter is not very sensitive.

It is, therefore, an object of this invention to provide a colorimeter which can relatively accurately match the standard response curves.

THE INVENTION

According to the invention in one aspect there is provided a colorimeter comprising means for illuminating a sample whose colour is to be measured, a plurality of light guides extending between a light detector and a sensing head which is capable of being positioned so that the ends of the light guides receive light from the sample, at least one, and preferably most or all, of the light guides having associated therewith an individual correcting filter so that the light received by the detector from at least one of the light guides has passed through the individual correcting filter associated with that light guide and so the output from the detector is representative of X, Y or Z of the Standard Observer as defined by the Commission Internationale de L'Eclairage or some other function.

The output from the detector gives, when using a particular filter or set of filters, one of the values X, Y and Z. By changing the filter or set of filters associated with the light guides the two other values can be measured, and so the colorimeter of the invention can be used to identify a particular colour exactly. By a suitable choice of filters, the outputs from the detector can, for example, be representative of L, a and b or alternatively the values X, Y and Z can be converted electrically to L, a and b if so desired.

Because each or most of the light guides can be provided with its own individual correcting filter and the light from all these light guides is combined before measurement, one can choose the filters to modify the light according to additive mixture principles. The larger the number of light guides, the more filters can be used additively to adjust the response of the colorimeter to the C.I.E. standard. In practice we find that it is sufficient to employ about five or six light guides, with one or more or each provided with its own individual correcting filter. The additive nature of the light paths enables one to achieve a better match with the C.I.E. Standard Observer than can usually be achieved by the use of a number of subtractive filters and in addition the amount of light received by the detector can be relatively large and so the instrument can be highly sensitive. Further each light guide may be provided with a pair of correcting filters, i.e. one at each end of the light guide, which themselves function subtractively so as to give more accurate matching.

Light detectors, even those of nominally the same type, may vary from one to another in their spectral response. With a colorimeter according to this invention the response curves of each individual colorimeter can be directly determined and suitable correcting filters used with the light guides.

Because light is collected from a number of directions by the light guides, their positions in relation to the sample under test can be chosen so that they are evenly spaced around the sample and then any differences in reflection from the sample will be averaged out.

Therefore according to the invention in another aspect there is provided a colorimeter comprising means for illuminating a sample, a sensing head for collecting light from a number of directions evenly spaced around the sample and means extending between the sensing head and a light detector for transmitting the collected light to the detector, and one or more filters through which the light collected from some or all of the directions are passed before the collected light is supplied to the detector so that the output from the detector can be arranged to be representative of one of the three primary stimuli X, Y or Z of the Standard Observer as defined by the Commission Internationale de L'Eclairage or any other function.

It is desirable to pass the light from all the light guides through a diffuser before the light impinges on the detector so as to achieve a uniform distribution of light. In addition it may sometimes be desirable to interpose one or more subtractive filters between the ends of the light guides and the light detector.

As will be appreciated, a colorimeter in accordance with the invention provides one with a large number of choices of filters and their positioning and this provides one with a very large number of degrees of freedom. Therefore, one can choose as many filters and light guides as are required in a particular instance to give the accuracy required in that case, the more degrees of freedom one uses the closer the approximation to Standard Observer as defined by the Commission Internationale de L'Eclairage.

The detector may be a photocell or photomultiplier.

Conveniently the light guides or means extending between the sensing head and light detector can be bundles of fibre optics. These have the advantages that they are flexible, losses of transmitted light are low, and the ends of the bundles can be placed relatively close to the sample under test and will often make a relatively wide light pick-up angle with the sample so collecting relatively large amounts of light.

The sample under test needs to be illuminated by a light source of constant brightness and spectral energy distribution and this can normally be achieved satisfactorily by means of an electric lamp supplied from a stabilized power source. For example, the lamp can be one run to give light of a colour temperature of 2854°A (i.e. C.I.E. Standard Illuminant A).

In instrumental colour measurement and control it is important to choose an instrument which gives numerical values of the colour or colour differences which correlate with visual estimates as judged by experienced colour matchers. To achieve good correlation between visual and instrumental results, the accurate duplication of the C.I.E. functions is not enough. The geometry of the illumination and viewing used by the colour inspector should be reproducible instrumentally. In 1931 the C.I.E. recommended the 45°/0° geometry as standard practice for measurements on opaque surfaces, and in 1967 four other arrangements were recommended. Depending on the surface characteristics of the test sample one geometry may be better than another. Conventional colorimeters usually use one geometry only and hence, they could be useful only for colour measurements of a limited number of materials. Using flexible light guides in the design of the present invention, colour measurements can be obtained for any desired geometry by using different sensing heads in which the ends of the light guides are carried at appropriate viewing angles and these heads can then be easily and quickly interchanged. Also, a combination of more than one geometry is possible.

A particularly advantageous way of illuminating the sample is by means of an additional light guide, e.g. a bundle of fibre optics, extending from the electric lamp to the particular sensing head used. The important advantages of this are that the sensing head can be chosen to suit the particular requirements of the sample under test and need not be fixed because the light guides may be flexible and hence the sensing head can be remote from the light source and light detector. These advantages can be exploited by presenting the head to the sample instead of bringing the sample to the head. This makes the colorimeter of the present invention particularly useful in the control of industrial processes. For example, the colorimeter can be used to control the colour of a batch of paint by say, viewing the paint with a suitable head and using the output from the detector to control the addition of colouring materials to achieve a desired colour. Another example is in the control of processes, e.g. anodising, where a colour change occurs; here the head can be used to sense the colour of the product and the output from the detector can be used to gauge the progress of the reaction and if required to stop it at a particular point.

The instrument described is a single beam instrument. It can be readily converted to what is known as a double beam instrument by providing means for transmitting light when required directly from the lamp to the detector and not to the sample. Suitably these means can be another bundle of fibre optics together with a shutter which allows light from the lamp to pass either to the sample or directly to the detector. The advantage of a double beam instrument is that it can be calibrated from time to time to ensure that the lamp and the detectors are remaining constant in their output and response, respectively.

Besides being used as a colorimeter, the instrument according to the invention can be used as a spectrophotometer by substituting a monochromatic light source, e.g. a monochromator, for the lamp and eliminating the various filters associated with the light guides or means extending between the sensing head and light detector.

BRIEF DESCRIPTION OF THE DRAWINGS

A colorimeter according to the invention will now be described, by way of example, with reference to the accompanying diagrammatic drawings, in which:

FIG. 1 is a diagram of the colorimeter;

FIG. 2 is an enlarged detail of the detector head of the colorimeter;

FIG. 3 is an enlarged perspective view of one form of sensing head;

FIG. 4 is an axial section of the head shown in FIG. 3;

FIG. 5 is an enlarged section of another form of sensing head;

FIG. 6 is a diagrammatic view of another form of sensing head suitable for use in the colour control of paint manufacture; and FIG. 7 is a block diagram illustrating one way of using the head shown in FIG. 6.

DESCRIPTION OF THE PREFERRED EMBODIMENT

The colorimeter 10 shown in the drawings has a sensing head 12 for viewing a sample 14 whose colour is under test. The construction of suitable heads 12 will be described in due course. Extending from the head are six flexible light guides 16 to 21 each consisting of a bundle of fibre optics. These light guides extend to a detector head 22, whose construction will also be described in more detail in due course.

The detector head 22 is attached to a closed box 30 in which a photomultiplier 32 is positioned so as to receive the light from the detector head. A diffusing screen 33 is positioned in front of the photomultiplier 32, to ensure that the sum of the light travelling through the light guides 16 to 21 is spread evenly over the sensitive surface of the photomultiplier.

The sample 14 is illuminated by a light guide 34 which consists of a bundle of fibre optics. One end of the guide 34 receives light from an electric lamp 36 which is positioned in a closed box 38, while the other end extends to the head 12 to illuminate the sample. So as to keep the illumination constant, the lamp 36 is supplied from a stabilized power source 44. For example, the lamp can be energised to give light of a colour temperature of 2854°A (i.e. C.I.E. Standard Illuminant A).

Individual filters 46 and 25 can be placed over the end of one or more or all of the light guides 16 to 21 at the sensing head end of the light guides and at the detector head end of the light guides, respectively. These filters are not normally necessary, however.

As shown best in FIG. 2, the detector head comprises a pair of coaxially mounted cylinders 23 and 24, of which the inner cylinder 24 is rotatably mounted relative to the outer cylinder 23 and can be rotated relative the outer cylinder 23 by means of a knob 24d. The ends of the light guides 16 to 21 terminate at six symmetrically spaced ports 23a in the outer cylinder 23, the ports making angles of 45° with the axes of the two cylinders so that the light collected by the six light guides 16 to 21 is directed onto an axial spot 33a on the diffusing screen 33. The inner cylinder 24 has four groups of six ports 24a arranged around two peripheral rings, the inner cylinder 24 being slidable axially relative the outer cylinder so as to bring one or other ring of ports 24a into alignment with the ports 23a. Some or all of the ports 24a carry a filter or filter combination 26.

The spectral transmission of one set of filters or filter combinations 26, are chosen so that, taking into account the spectral sensitivity of the photomultiplier 32 and the spectral energy distribution of the lamp 36 and the spectral transmission of the light guides, the colorimeter as a whole has a response which can be accurately adjusted to match one of the three primary stimuli X, Y and Z of the Standard Observer as defined by the C.I.E. response curves, say one part of the X stimulus. Then by rotation of the inner cylinder 24 and axial displacement one can bring another group of ports 24a with their associated filters 26 into alignment with the ports 23a so making the response of the instrument match the other parts of the X stimulus and the Y and Z stimuli.

In some cases it may be desirable to include a subtractive filter 48 between the diffusing screen 33 and the photomultiplier 32, and this filter could if required be removed or changed when changing from measurement of one stimulus to another.

The photomultiplier 32 is supplied from a suitable voltage source 50 while its output is fed to a digital voltmeter 52 for presentation of the results in a convenient way, e.g. on a suitable counter. For smooth, flat opaque surfaces, e.g. point films, plastics, ceramic tiles, vitrolite opaque glass, we have found that a sensing head 12a as shown in FIGS. 3 and 4 is most suitable. This comprises a cone-shaped shell 50 having a hemispherical inside surface 51 with, for example, an internal diameter 1 inch. The illuminating light guide 34 is fitted to a port 34a in its apex. The light guides 16 to 21 are fitted in ports 16a to 21a symmetrically located around the apex and having their axes each inclined at an angle α (FIG. 4) of 45° and intersecting at the centre of the sphere. This provides an illuminated circular area of about ¼ inch diameter of the sample 14 placed against the port. As can be seen the light guides 16 to 21 collect the light evenly from around the illuminated spot on the sample 14 and this averages out any irregularities in reflection. A sensing head similar to the head 12a as shown in FIGS. 3 and 4 but with inner hemispherical surface of 2 inches internal diameter illuminating an area of ½ inch diameter was found more suitable for surfaces exhibiting texture. It was tried on different samples of cotton fabric and man-made fibre yarns. Variations in the measurements of colour for different orientations of the fabrics or the yarn with respect to the sensing head were small. This is due to the integration of the light diffusely reflected from the material in six different directions. A larger number of the collecting elements will give readings independent of orientation and it is suitable for colour measurements of materials with pronounced directional reflections as in some fabrics and man-made fibre yarns.

In some cases, for example, colour anodising of aluminium, the sensing head has, to follow the colour change occurring with the process of anodising, to be dipped in the coloration bath at some distance from the aluminium surface being watched, so that it will not obstruct the anodising process. These conditions can be met by using the sensing head 12b illustrated in FIG. 5. This consists of a circular disc 52 of about 6 inches diameter with a central axial hole 54, surrounded by holes 56, each with its axis inclined at 45° and intersecting at 5 inches from the central hole. This head 12b with the light guides 34 and 16 to 21 fitted to it can be used for colour control in an anodising process to watch the colour change of one of a batch being treated and when the output from the voltmeter 52 shows that the desired colour has been reached the anodising process can be stopped. The colouration bath keeps a roughly constant colour during the anodising process and so this does not affect the results.

When measuring the colour of a fluid it has been found that there are various ways in which the colorimeter according to the invention can be used. For example, a suitable sensing head can be encased in a plastics material sheath having a glass window fixed over the end of a head 12a as shown in FIG. 3, the head then being immersed in the bulk of the fluid in a suitable container. Alternatively, the glass window could be a part in the wall of the fluid container.

We have found, however, that the preferred method when measuring the colour of paint or any other adhesive material such as syrup is to position a suitable head 12c as shown in FIG. 6 at a suitable distance above the surface of the liquid, the colour measured in this case being that of the liquid/air interface. This ensures that the paint at the interface is continually changing and is representative of the bulk of the paint and is not that which first contacted and became stuck to a transparent surface. This head 12c is eminently suitable for control of colour in paint manufacture both for batch and continuous production.

As shown in FIG. 6, the sensing head 12c is associated with a simple constant level device. The paint whose colour is to be measured flows into an inlet tube 60 to a funnel 62 which is enclosed in a light-proof cylindrical container 64. The sensing head 12c of the instrument is fixed to the top of the container either in alignment with a port in the container or in alignment with a transparent port of the container. The container has an outlet tube 66 at its base. The flowing paint fills the funnel and overflows to the outlet tube 66. By keeping the top edge of the funnel in a horizontal plane one can keep a constant distance between the surface of the paint and the sensing head and this makes it possible to measure accurately the colour of wet paint with a paint/air interface. The construction of the sensing head 12c can be similar to the head 12a, the spacing between the head and the sample being correctly matched.

In order to determine the colour of a particular sample 14, the particular sensing head 12 used is brought to the sample and light from the sample, which is of course illuminated from the lamp 36, passes along the various light guides and through one particular set of filters 26, depending upon which set of ports 24a is aligned with the ports 23a. The light from all the light guides is then received by the photomultiplier 32 and an output is registered on the voltmeter 52. By correct choice of filters 25, 46 and 48 if used and the particular set of filter 26 aligned with the light guides, the output shown by the voltmeter gives a value representative of say one part of the X stimulus. Thereafter, by rotating the inner cylinder 24 and causing another group of ports 24a with their corresponding sets of filters 26 to be aligned with the light guides, the instrument can be made to give values representative of the other part of the X stimulus and the Y and Z stimuli. In this way an exact and full determination of the colour of the sample 14 can be obtained.

As can be seen the colorimeter 10 according to the invention is relatively simple both in its arrangement and operation. In addition it is possible to choose the filters 26, and the filters 25, 46 and 48 if used, so that the colorimeter as a whole matches the C.I.E. standard response curves very closely. Each filter position provides an extra degree of freedom in matching to the C.I.E. standard observer and so the number of light guides and number of filters are chosen in accordance with the accuracy desired. In practice we find that the six light guides shown with suitable filters 26 and possibly also one filter 46 are sufficient but in any particular case more or less light guides may be required.

In addition, since individual photomultipliers 32 may differ in response, the filters can be chosen to suit a particular photomultiplier so that the response of each individual colorimeter can be made to agree closely with the Standard Observer.

Because the photomultiplier receives the sum of the light passing through all the light guides, the colorimeter can be more sensitive than a colorimeter where required spectral response is achieved by passing the light through a number of subtractive filters only, because a much larger proportion of the light collected from the sample can be presented to the photomultiplier 32.

As shown in the drawing, the light guides 16 to 21 and 34 need not be kept straight and their flexibility can be used because the head 12 does not have to be fixed relative to the remainder of the colorimeter. This has the advantage that the sample and head 12 can be in a remote and inaccessible position while the remainder of the colorimeter is kept under ideal controlled conditions. This makes the colorimeter of the invention particularly useful in the control of many processes, where a colour change occurs, e.g. paint preparation, electrolytic colouring processes, paper manufacture, ceramics, textile dying and heat treatments such as hardening or annealing, because the output from the photomultiplier 32 can be used to gauge the stage of the process and accordingly to control it.

In order to provide for calibration of the colorimeter 10, it can be converted from a single beam instrument to a double beam instrument by providing an additional light guide 40 from the lamp housing 38 to the detector head, for example, axially through the knob 24d. Also extending across the housing 38 is a slidable partition 41 in which is a slit 42. By moving the partition 41, one can line up the slit 42 with the guide 34 or 40, depending upon whether one wishes to check the colour of the sample 14 or to calibrate the instrument, respectively.

Besides being used as a colorimeter, the instrument according to the invention can be used as a spectrophotometer by substituting a monochromatic light source, e.g. a monochromator, for the bulb 36 and eliminating the filters 26, and 25 and 46 if used.

Repeated measurements of the relative tristimulus values of X, Y and Z on a smooth flat opaque tile were made using a head 12a as shown in FIG. 3a. The range of variation in the results over a period of three months rarely exceeded 0.2 percent as shown in the table where columns 1, 2 and 3 are measurements taken at 6 week intervals.

| Samples | Relative Values | | | Relative Values | | | Relative Values | | |
| --- | --- | --- | --- | --- | --- | --- | --- | --- | --- |
| | X | Y | Z | X | Y | Z | X | Y | Z |
| 1a | 1000 | 1000 | 1000 | 1000 | 1000 | 1000 | 1000 | 1000 | 1000 |
| 1b | 991 | 994 | 996 | 990 | 994 | 995 | 990 | 994 | 995 |
| 2a | 999 | 1000 | 1000 | 999 | 1000 | 1000 | 999 | 1000 | 1000 |
| 2b | 1000 | 1000 | 999 | 1000 | 1000 | 1000 | 1000 | 1000 | 1000 |
| 3a | 987 | 992 | 995 | 985 | 994 | 995 | 985 | 993 | 996 |
| 3b | 1000 | 1000 | 1000 | 1000 | 1000 | 1000 | 1000 | 1000 | 1000 |
| 4a | 963 | 960 | 960 | 962 | 960 | 957 | 963 | 960 | 959 |
| 4b | 1000 | 1000 | 1000 | 1000 | 1000 | 1000 | 1000 | 1000 | 1000 |
| 5a | 1000 | 1000 | 1000 | 1000 | 1000 | 1000 | 1000 | 1000 | 1000 |
| 5b | 957 | 953 | 950 | 954 | 953 | 949 | 956 | 954 | 950 |
| 6a | 1000 | 993 | 993 | 1000 | 992 | 993 | 1000 | 992 | 992 |
| 6b | 969 | 1000 | 1000 | 970 | 1000 | 1000 | 970 | 1000 | 1000 |

As can be seen from these results, the sensitivity of the colorimeter according to the invention was of a high order and the drift over a period of 3 months was very low indeed.

The colorimeter 10 according to the invention was used to follow the progress of an anodising operation on a piece of aluminium. The head 12b shown in FIG. 5 was used. The sample of aluminium was presented to the head at a distance of 5 inches from the head during the coloration process. When the read-out on the digital voltmeter indicated the required colour, the process was stopped. This was repeated for different standard colours showing a close degree of colour control compared with the standard.

The head 12c shown in FIG. 6 was used to control the production of a paint in the way illustrated in FIG. 7.

Paint was prepared from pumping suitable amounts of differently tinted bases from four storage reservoirs 70 to 73 by means of variable capacity pumps 74 to 77, respectively. The amounts of the tinted bases were then mixed in a mixer 78 and fed to a collecting vessel 79 through a line 80.

In the line 80 is a check valve 82 and the inlet tube 60 and outlet tube 66 join the line 80 on either side of this check valve. In this way, a small part of the paint made in the mixer 78 is passed via the head 12c.

The colorimeter 10 was used to determine the colour of the paint passing through the head 12c and its output was fed to a process control computor 83 and in turn the output from the computor 83 was fed to a flow control device 84 which adjusts the capacity of the variable capacity pumps 74 to 77 so as to give more or less of particular tinted bases so that the colour of the final paint is that required.

The results obtained by making a paint in this way demonstrated the high sensitivity and reproducibility of the measurements made by the colorimeter 10 as was found when determining the colour of opaque solid surfaces.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A colorimeter for determining the color of a sample comprising:
   a. a stabilized light source;
   b. a sensing head;
   c. an illuminating bundle of fibre optics extending between said light source and said sensing head and having a light receiving end adjacent said light source and a light emitting end at said sensing head for illuminating a discrete area of said sample;
   d. a number of light guide bundles of fibre optics having light receiving ends at said sensing head for receiving light from said discrete area of said sample, said bund being capable of transmitting said light received along their lengths;
   e. said sensing head having means for supporting said light emitting end of said illuminating bundle of fibre optics in a direction normal to the surface of said sample so that said sample is illuminated by light from said light emitting end of said bundle in a substantially normal direction, and for supporting said light receiving ends of said light guide bundles of fibre optics so that they are at an angle of 45° to said light emitting end of said illuminating bundle of fibre optics and are evenly spaced around the light emitting end of said bundle of fibre optics;
   f. means for maintaining the surface of said sample normal to said light emitting end and at an angle of 45° to each of said light receiving ends, whereby said light emitting end illuminates said discrete area substantially normally and said light receiving ends receive light from said illuminated discrete area at an angle of about 45° to the normal to said surface;
   g. a light detector to which light transmitted by said light guide bundles is conducted for determination of the sum of said light transmitted by said bundles;
   h. subtractive filter means for filtering at least part of said light transmitted by said light guide bundles and conducted to said detector so as to modify the spectral response of said detector to one color function, said filter means including individual light subtractive filters for filtering light passing through at least one light guide bundle, and said filter means comprising adjacent relatively rotatable supporting members respectively having ports extending through the members which can be brought into mutual registration by relative rotation, said light guide bundles terminating in the ports of one of said members, and at least some of the ports in the other member supporting filters therein, and means for rotating said members one with respect to the other so as to align particular ports in mutual registration, such alignment of particular ports in turn interposing filter arrangements between at least some of said light guide bundles and said detector so as to modify said spectral response to said detector to each color function in turn so as to measure the color of said sample, and
   i. means for determining the output of said detector when modified by said filter means to each color function in turn.

2. A colorimeter according to claim 1 in which said subtractive filter means include at least one subtractive filter positioned between said ends of all of said bundles of fibre optics and said detector.

3. A colorimeter for determining the color of a sample comprising:
   a. means for illuminating a discrete area of said sample normally to its surface;
   b. a sensing head positioned so as to receive light from said illuminated discrete area of said sample;
   c. a light detector;
   d. a plurality of light guides extending between said sensing head and said light detector, said light guides having light receiving ends for receiving light from said illuminated discrete area of said sample and supported by said sensing head and directed towards said sample, said light receiving ends being spaced around a normal to the surface of said sample at substantially equal angles to said normal, and having light output ends for directing said light received by said light receiving ends and transmitted by said light guides to said detector;
   e. filter means positioned between said light output ends of said light guides and said detector, said filter means including an individual correcting subtractive filter associated with at least some of said light guides so as to filter the said light from said associated light guides before it is applied to said detector, said filter means further comprising adjacent relatively rotatable supporting members respectively having ports extending through the members which can be brought into mutual registration by relative rotation, said light output ends of said light guides terminating in the ports of one of said members, and at least some of the ports in the other member supporting filter means therein, and means for rotating said members one with respect to the other to align different filter means with the light output ends of said light guides to modify said spectral response of said detector to one color function and the filter means being arranged to be changed by successive rotations of the members to modify said response to each color function in turn so as to measure the color of said sample, and
   f. means for determining the output from the detector when modified for each color function.

4. A colorimeter according to claim 3, in which said light guides are bundles of fibre optics.

5. A colorimeter for determining the color of a sample comprising:
   a. a stabilized light source;
   b. a sensing head;
   c. an illuminating bundle of fibre optics extending between said light source and said sensing head and having a light receiving end adjacent said light source and a light emitting end at said sensing head for illuminating a discrete area of said sample;

d. a number of light guide bundles of fibre optics having light receiving ends at said sensing head for receiving light from said discrete area of said sample, said bundles being capable of transmitting said light received along their lengths;

e. said sensing head having means for supporting said light emitting end of said illuminating bundle of fibre optics in a direction normal to the surface of said sample so that said sample is illuminated by light from said light emitting end of said bundle in a substantially normal direction, and for supporting said light receiving ends of said light guide bundles of fibre optics so that they are at an angle of 45° to said light emitting end of said illuminating bundle of fibre optics and are evenly spaced around the light emitting end of said bundle of fibre optics;

f. means for maintaining the surface of said sample normal to said light emitting end, and at an angle of 45° to each of said light receiving ends, whereby said light emitting end illuminates said discrete area substantially normally and said light receiving ends receive light from said illuminated discrete area at an angle of about 45° to the normal to said surface;

g. a light detector to which light transmitted by said light guide bundles is conducted for determination of the sum of said light transmitted by said bundles;

h. subtractive filter means for filtering at least part of said light transmitted by said light guide bundles and conducted to said detector so as to modify the spectral response of said detector to one color function, said filter means being arranged to be changed to modify said spectral response to said detector to each color function in turn so as to measure the color of said sample;

i. means for determining the output of said detector when modified by said filter means to each color function in turn; and j. said filter means including individual light subtractive filters for filtering the light passing through at least one light guide bundle for modifying said spectral response of said detector to each color function in turn, and said filter means including an outer sleeve, and inner sleeve rotatably mounted within said outer sleeve, a number of ports in said outer cylinder, said light guide bundles terminating in said ports in said outer sleeve, a number of ports provided in said inner sleeve, at least one of said ports in said inner sleeve having a filter arrangement, and means for rotating said inner and outer sleeve relative to one another so as to align particular ports in said inner and outer sleeves, whereby alignment of particular groups of ports in turn, interposes filter arrangements between said light guide bundles and said detector so as to modify its spectral response to each color function in turn.

6. A colorimeter for determining the color of a sample comprising:

a. means for illuminating a discrete area of said sample normally to its surface;

b. a sensing head positioned so as to receive light from said illuminated discrete area of said sample;

c. a light detector;

d. a plurality of light guides extending between said sensing head and said light detector, said light guides having light receiving ends for receiving light from said illuminated discrete area of said sample and supported by said sensing head and directed towards said sample, said light receiving ends being spaced around a normal to the surface of said sample at substantially equal angles to said normal and light output ends for directing said light received by said light receiving ends and transmitted by said light guides to said detector;

e. filter means positioned between said light outputs ends of said light guides and said detector, said filter means including an individual correcting subtractive filter associated with at least one, and preferably most, of said light guides so as to filter the said light from said associated light guides before it is applied to said detector, said filter means modifying said spectral response of said detector to one color function and being arranged to be changed to modify said response to each color function in turn so as to measure the color of said sample;

f. means for determining the output from the detector when modified for each color function; and g. further comprising an outer sleeve, an inner sleeve rotatably mounted within said outer sleeve, a number of ports in said outer cylinder, said light output ends of said light guides terminating in said ports, a number of ports in said inner sleeve, filters being provided in at least one, and preferably most, of said ports in said inner sleeve, and means for rotating said inner and outer sleeves to align different filters with the light output ends of said guides to modify the spectral response of said detector to each color function in turn.

* * * * *